US012725797B2

(12) United States Patent
Shimizu

(10) Patent No.: US 12,725,797 B2
(45) Date of Patent: Sep. 1, 2026

(54) POSITIVE ELECTRODE ACTIVE MATERIAL AND BATTERY

(71) Applicant: TOYOTA JIDOSHA KABUSHIKI KAISHA, Toyota (JP)

(72) Inventor: Yuusuke Shimizu, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 163 days.

(21) Appl. No.: 18/909,777

(22) Filed: Oct. 8, 2024

(65) Prior Publication Data

US 2025/0149573 A1 May 8, 2025

(30) Foreign Application Priority Data

Nov. 7, 2023 (JP) ................................ 2023-190384

(51) Int. Cl.

*H01B 1/08* (2006.01)
*C01G 53/82* (2025.01)
*H01M 4/36* (2006.01)
*H01M 4/525* (2010.01)

(52) U.S. Cl.

CPC ........... *H01M 4/525* (2013.01); *C01G 53/82* (2025.01); *H01B 1/08* (2013.01); *H01M 4/366* (2013.01); *C01P 2004/50* (2013.01); *C01P 2006/40* (2013.01)

(58) Field of Classification Search

CPC ... H01B 1/00; H01B 1/06; H01B 1/08; C01G 53/82; H01M 4/366; H01M 4/525
See application file for complete search history.

(56) References Cited

U.S. PATENT DOCUMENTS

| | | | | |
|---|---|---|---|---|
| 12,113,214 | B2 * | 10/2024 | Zhang | H01M 4/131 |
| 12,412,891 | B2 * | 9/2025 | Kintsu | H01M 4/131 |
| 2020/0006767 | A1 * | 1/2020 | Du | H01M 4/525 |
| 2021/0013508 | A1 * | 1/2021 | Kuroda | H01M 4/505 |
| 2022/0115648 | A1 | 4/2022 | Hanazaki et al. | |
| 2022/0388865 | A1 * | 12/2022 | Kim | H01M 4/366 |
| 2025/0059063 | A1 * | 2/2025 | Song | H01M 4/366 |

FOREIGN PATENT DOCUMENTS

| | | |
|---|---|---|
| JP | 2019-164960 A | 9/2019 |
| JP | 2022-063677 A | 4/2022 |

OTHER PUBLICATIONS

Trevisanello et al "Polycrystalline and Single Crystalline NCM Cathode Materials-Quantifying Particle Cracking, Active Surface Area, and Lithium Diffusion", Adv. Energy Mater. 2021, 11, 2003400.*
Han et al "Single-Crystalline Cathodes for Advanced Li-Ion Batteries: Progress and Challenges", Small 2022, 18, 2107048.*
Payandeh et al "The Effect of Single versus Polycrystalline Cathode Particles on All-Solid-State Battery Performance", Adv. Mater. Interfaces 2023, 10, 2201806.*
Cheng et al "Comparison of monocrystalline and secondary LiNi0.5Co0.2Mn0.3O2 cathode material for high-performance lithium-ion batteries", Journal of Alloys and Compounds 845 (2020) 156202.*

* cited by examiner

*Primary Examiner* — Mark Kopec
(74) *Attorney, Agent, or Firm* — SoraIP, Inc.

(57) ABSTRACT

A positive electrode active material includes nickel contained as a transition metal in a ratio of 70 mol % or more of the total transition metal; and polycrystalline particles and monocrystalline particles, in which a B/A value calculated from a lithium hydroxide content A (mass %) of the polycrystalline particles and a lithium hydroxide content B (mass %) of the monocrystalline particles is 1.03 to 1.9.

5 Claims, No Drawings

POSITIVE ELECTRODE ACTIVE MATERIAL AND BATTERY

CROSS-REFERENCE TO RELATED APPLICATION

This application claims priority to Japanese Patent Application No. 2023-190384 filed on Nov. 7, 2023, incorporated herein by reference in its entirety.

BACKGROUND 1. Technical Field

The present disclosure relates to a positive electrode active material and a battery.

2. Description of Related Art

A lithium transition metal composite oxide as a composite oxide of lithium and a transition metal is widely used as a positive electrode active material of a lithium ion secondary battery.

Among the lithium transition metal composite oxides, those containing nickel as a transition metal in a ratio of 70 mol % or more of the total transition metal have high energy density, and are increasingly used as the positive electrode active material.

A positive electrode active material containing a high ratio of nickel has a large volume change due to charge and discharge, and thus cracks tend to occur in particles of such a positive electrode active material. In particular, when the positive electrode active material is in a state of particles with a polycrystalline structure, cracks tend to occur at grain boundaries in the polycrystalline structure. Cracking of the particles of the positive electrode active material causes a decrease in the cycle life of the battery. Therefore, it has been studied to suppress a decrease in cycle life by combining monocrystalline particles that are relatively less likely to be cracked with the polycrystalline particles of the positive electrode active material (see Japanese Unexamined Patent Application Publication No. 2022-63677 (JP 2022-63677 A), for example).

SUMMARY

In a battery including a positive electrode including polycrystalline particles and monocrystalline particles of a positive electrode active material, there is room for improvement in a capacity retention rate in a state in which the ratio of nickel in the positive electrode active material is high and the constraining pressure of the battery is low. An issue of the present disclosure is to provide a positive electrode active material capable of providing a battery that exhibits an excellent capacity retention rate even in a state in which the ratio of nickel in the positive electrode active material is high and the constraining pressure is low, and a battery in which the positive electrode active material is used.

The means for addressing the above issue includes the following aspects.

<1>A positive electrode active material including:

nickel contained as a transition metal in a ratio of 70 mol % or more of a total transition metal; and polycrystalline particles and monocrystalline particles, in which a B/A value calculated from a lithium hydroxide content A mass % of the polycrystalline particles and a lithium hydroxide content B mass % of the monocrystalline particles is 1.03 to 1.9.

<2>The positive electrode active material according to <1>, in which the positive electrode active material is provided with a layered structure.

<3>The positive electrode active material according to <1>or <2>, in which a mass ratio of the polycrystalline particles to the monocrystalline particles is in a range of 60:40 to 90:10.

<4>A battery including a positive electrode including the positive electrode active material according to any one of <1>to <3>.

<5>The battery according to <4>, in which a constraining pressure is less than 500 kPa.

According to an embodiment of the present disclosure, there are provided a positive electrode active material capable of providing a battery that exhibits an excellent capacity retention rate even in a state in which the ratio of nickel in the positive electrode active material is high and the constraining pressure is low, and a battery in which the positive electrode active material is used.

DETAILED DESCRIPTION OF EMBODIMENTS

In the present disclosure, a numerical range indicated by using "to" means a range including numerical values described before and after "to" as a minimum value and a maximum value, respectively.

In the numerical range described in the present disclosure in a stepwise manner, the upper limit value or the lower limit value described in a certain numerical range may be replaced with the upper limit value or the lower limit value of the numerical range described in another stepwise manner. In the numerical ranges described in the present disclosure, the upper limit value or the lower limit value described in a certain numerical range may be replaced with the value shown in the examples.

In the present disclosure, the term "step" is included in the term as long as the intended purpose of the step is achieved, even if it is not clearly distinguishable from other steps as well as independent steps.

In the present disclosure, a combination of two or more preferred embodiments is a more preferred embodiment.

In the present disclosure, the amount of each component means the total amount of a plurality of substances unless otherwise specified, when a plurality of substances corresponding to each component are present.

Positive Electrode Active Material

The positive electrode active material of the present disclosure includes: Nickel is included as the transition metal, and the proportion of nickel is 70 mol % or more of a total transition metal, Including polycrystalline particles and monocrystalline particles, a B/A value calculated from a lithium hydroxide content A (mass %) of the polycrystalline particles and a lithium hydroxide content B (mass %) of the monocrystalline particles is 1.03 to 1.9.

As shown in the embodiments described below, the battery obtained by using a positive electrode active material in which polycrystalline particles and monocrystalline particles are included and the value of B/A is within the range of 1.03 to 1.9 exhibits an excellent capacity retention ratio as compared with the following batteries (i) and (ii).

(i) Battery in which the positive electrode active material does not contain either polycrystalline particles or monocrystalline particles (ii) A battery obtained by using a positive electrode active material with a B/A value outside the range of 1.03 to 1.9.

The reason for this is inferred as follows, for example. However, the present disclosure is not limited by the following inference.

monocrystalline particles of the positive electrode active material are isolated by repeated expansion and contraction caused by charging and discharging of the battery, and the conductive path is easily cut. The positive electrode active material of the present disclosure has a relatively large amount of lithium hydroxide present on the surface of the monocrystalline particles (i.e., the value of B/A is 1.03 or more), and thus a relatively large amount of a binder or a conductive auxiliary agent is disposed around the monocrystalline particles in the positive electrode. As a result, cutting of the conductive path due to isolation of the monocrystalline particles is less likely to occur, and a decrease in the capacity retention rate of the battery is suppressed. On the other hand, a B/A value of 1.9 or less ensures that a sufficient amount of a binder or a conductive auxiliary agent is disposed around the polycrystalline particles, and a decrease in the capacity retention rate of the battery is suppressed.

In the present disclosure, a “polycrystalline particle” is a particle with a polycrystalline structure that is an aggregate of single crystals. The polycrystalline particles are, for example, secondary particles formed by aggregation of single-crystal primary particles. The number of primary particles constituting one secondary particle may be, for example, 10 or more, 50 or more, or 100 or more. The number of primary particles constituting one secondary particle may be, for example, 10000 or less.

The average particle size of the polycrystalline particles can be selected from the range of 5.0 μm to 30.0 μm or 7.0 μm to 20.0 μm, for example. The mean particle diameter of the polycrystalline particles is defined as the particle diameter (D50) when the cumulative volume is 50% in the volume-based particle size distribution. The volume-based particle size distribution is obtained, for example, by a laser diffraction and scattering method.

In the present disclosure, “monocrystalline particle” means a particle having the same crystal axis direction at any position. The monocrystalline particles are, for example, primary particles (single particles) that do not form secondary particles.

The average particle diameter of the monocrystalline particles can be selected, for example, from the range of 0.5 μm to 10.0 μm or 1.0 μm to 5.0 μm. The mean particle diameter of the monocrystalline particles is defined as the particle diameter (D50) when the cumulative volume is 50% in the volume-based particle size distribution. The volume-based particle size distribution is obtained, for example, by a laser diffraction and scattering method.

The positive electrode active material of the present disclosure contains nickel as a transition metal, and is not particularly limited as long as the ratio of nickel is 70 mol % or more of the total transition metal.

The proportion of nickel may be greater than or equal to 75 mol %, or greater than or equal to 80 mol % of the total transition metal. The proportion of nickel may be less than or equal to 90 mol %, or less than or equal to 85 mol % of the total transition metal.

It is more preferable that the positive electrode active material contains nickel as a transition metal and at least one selected from cobalt and manganese, and it is more preferable that the positive electrode active material contains nickel, cobalt, and manganese (NCM, nickel cobalt manganese oxide).

The positive electrode active material may be composed only of lithium, oxygen, and a transition metal selected from Ni, Co, and Mn, or may contain an element other than these elements (hereinafter, also referred to as another element). When the positive electrode active material contains other elements, the proportion thereof may be 10 mol % or less, 5 mol % or less, or 1 mol % or less of the entire positive electrode active material.

When the positive electrode active material contains other elements, the proportion of the other elements may be 0.001 mol % or more, 0.01 mol % or more, or 0.1 mol % or more of the entire positive electrode active material.

The positive electrode active material is preferably a composite oxide (lithium transition metal composite oxide) containing lithium and one or more transition metals.

The positive electrode active material preferably is provided with a layered structure. The layered structure may be, for example, a crystal structure in which a transition metal layer formed of an octahedral structure composed of transition metal atoms and oxygen atoms and a lithium layer are alternately arranged.

The positive electrode active material may be a compound having a composition represented by the following formula (1).

$$Li_{1-a}Ni_xMe_{1-x}O_2 \quad (1)$$

In the formula (1), a satisfies the relationship of $-0.3 \leq a \leq 0.3$, x satisfies the relationship of $0.7 \leq x \leq 1.0$, Me represents at least one selected from the group consisting of Co, Mn, Al, Zr, B, Mg, Fe, Cu, Zn, Sn, Na, K, Ba, Sr, Ca, W, Mo, Nb, Ti, Si, V, Cr, and Ge.

In the positive electrode active material of the present disclosure, the mixing ratio of the polycrystalline particles and the monocrystalline particles is not particularly limited. From the viewpoint of balancing the properties of the positive electrode active material, the mass ratio of the polycrystalline particles to the monocrystalline particles (polycrystalline particles: monocrystalline particles) may be selected from 60:40 to 90:10 or 65:35 to 85:15.

The positive electrode active material may or may not contain particles that do not correspond to polycrystalline particles or monocrystalline particles (such as primary particles with a particle diameter of less than 0.5 μm). The proportion of the particles not corresponding to the polycrystalline particles or the monocrystalline particles is preferably 0% by mass and to 10% by mass of the entire positive electrode active material.

The lithium hydroxide content A of the polycrystalline particles and the lithium hydroxide content B of the monocrystalline particles can be selected, for example, from a range of 0.05% by mass to 1.0% by mass or from 0.1% by mass to 6.0% by mass, respectively, independently.

Since the positive electrode active material of the present disclosure contains a high content of nickel, it has high reactivity with moisture, and the amount of lithium hydroxide formed on the surface of a fired product obtained by firing a raw material of the positive electrode active material tends to be large. Therefore, the lithium hydroxide content A of the polycrystalline particles and the lithium hydroxide content B of the monocrystalline particles may be adjusted by removing a part of the lithium hydroxide present on the surface of the calcined product of the raw material of the positive electrode active material.

In the present disclosure, the lithium hydroxide content A of the polycrystalline particles and the lithium hydroxide content B of the monocrystalline particles are determined by a neutralization titration method.

The B/A value calculated from the lithium hydroxide content A of the polycrystalline particles and the lithium hydroxide content B of the monocrystalline particles is not particularly limited as long as within the range of 1.03 to 1.9. From the viewpoint of maintaining a good capacity retention ratio of the batteries, the B/A value may be 1.05 or more, 1.08 or more, or 1.1 or more.

From the viewpoint of maintaining a good capacity retention ratio of the batteries, the B/A value may be 1.85 or less, 1.8 or less, or 1.7 or less.

The raw material of the positive electrode active material is not particularly limited, and may be selected from known raw materials. For example, the raw material of the positive electrode active material may be a mixture containing a compound containing a transition metal (hydroxide, carbonate, or the like) and a compound containing lithium (hydroxide, carbonate, or the like).

Battery

The battery of the present disclosure includes a positive electrode including the positive electrode active material described above.

As shown in Examples to be described later, the battery of the present disclosure exhibits an excellent capacity retention rate even in a state where the restraint pressure is low. Lowering the restraining pressure of the battery is effective, for example, as a measure for reducing the amount of the electrolyte discharged outside the negative electrode when the negative electrode expands during charging of the battery.

The constraining force of the cell may be less than 500 kPa, less than or equal to 400 kPa, less than or equal to 300 kPa, or less than or equal to 200 kPa.

The restraint force of the cell may be greater than or equal to 100 kPa or greater than or equal to 150 kPa.

The positive electrode included in the battery includes, for example, a current collector and a positive electrode layer disposed on the current collector, and the positive electrode layer includes the positive electrode active material of the present disclosure.

The positive electrode layer may be disposed on one side or both sides of the current collector.

Examples of the material constituting the current collector of the positive electrode include aluminum, an aluminum alloy, nickel, titanium, and stainless steel. Examples of the shape of the current collector include a foil and a mesh.

The positive electrode layer is disposed on the current collector by, for example, applying a slurry-like positive electrode material to one or both surfaces of the current collector. If necessary, a pressure treatment for adjusting the density of the positive electrode layer may be performed. The thickness of the positive electrode layer is not particularly limited, and can be selected from, for example, a range of 10 μm to 100 μm.

The positive electrode material may be in a state of a mixture containing components other than the positive electrode active material, such as a conductive aid and a binder. If desired, a solvent may be added to the mixture to adjust the viscosity of the mixture.

Specific examples of the conductive aid include carbon materials such as carbon black (acetylene black, thermal black, furnace black, and the like), carbon nanotubes, and graphite.

The conductive material contained in the positive electrode material may be one kind alone or two or more kinds thereof.

Specific examples of the binder include polyvinylidene fluoride (PVDF), polyethylene, polypropylene, polyethylene terephthalate, cellulose, nitrocellulose, carboxymethylcellulose, polyethylene oxide, polyepichlorohydrin, polyacrylonitrile, styrene-butadiene rubber (SBR), acrylonitrile-butadiene rubber (NBR), polyacrylate, and polymethacrylate.

The binder contained in the positive electrode material may be one kind alone or two or more kinds thereof.

The battery of the present disclosure includes, for example, a positive electrode, a negative electrode, and an electrolyte.

The negative electrode includes, for example, a current collector and a negative electrode layer disposed on the current collector and including a negative electrode active material.

Examples of the negative electrode active material include carbon materials such as graphite, hard carbon, soft carbon, and activated carbon, silicon, metallic lithium, lithium alloy, and lithium titanate (LTO).

Examples of the material constituting the current collector of the negative electrode include copper, a copper alloy, nickel, titanium, and stainless steel. Examples of the shape of the current collector of the negative electrode include a foil and a mesh.

The electrolyte may be either a liquid or a solid. As the liquid electrolyte (electrolyte solution), a solution obtained by dissolving a known electrolyte such as LiPF6 in an organic solvent can be used without any particular limitation.

Specific examples of the organic solvents include cyclic or linear carbonates such as ethylene carbonate (EC), dimethyl carbonate (DMC), diethyl carbonate (DEC), and ethyl methyl carbonate (EMC). The solvent may be a mixture of two or more solvents or a mixture comprising a cyclic carbonate and a linear carbonate.

Solvents may include additives such as vinylene carbonate (VC).

As the solid electrolyte, a known solid electrolyte such as a sulfide solid electrolyte, an oxide solid electrolyte, or a halide solid electrolyte can be used without any particular limitation.

The lithium ion secondary battery may include a separator disposed between the positive electrode and the negative electrode. Examples of the separator include a nonwoven fabric, a cloth, and a microporous film containing a polyolefin as a main component, such as polyethylene and polypropylene.

Hereinafter, the present disclosure will be described in more detail with reference to Examples, but the disclosure of the present disclosure is not limited to these

EXAMPLES

Examples 1 to 3

(1) Preparation of Positive Electrode

Polycrystalline particles (average particle diameter: 10.3 μm) and monocrystalline particles (average particle diameter: 3.5 μm) of a positive electrode active material containing nickel (80 mol %), cobalt (10 mol %), and manganese (10 mol %) as transition metals were prepared, respectively. The amount of lithium hydroxide present on the surfaces of the polycrystalline particles and the monocrystalline particles was adjusted by changing the cleaning conditions of the particles.

The lithium hydroxide content A of the polycrystalline particles and the lithium hydroxide content B of the monocrystalline particles were determined by a neutralization titration method.

Specifically, pure water 100 mL was added to the sample 10 g to be measured, and the mixture was stirred for 1 minute, followed by suction filtration, and the filtrate thus obtained was titrated. 1 mol/L hydrochloric acid was used as the measuring agent, and F-72 made of HORIBA was used as pH meter.

The lithium hydroxide content (g) obtained from the titration was divided by the amount of the measured sample (10 g) to calculate the lithium hydroxide content A or lithium hydroxide B (mass %).

The polycrystalline particles of the positive electrode active material and the monocrystalline particles were mixed at the ratios shown in Table 1 to obtain a positive electrode active material mixture. A positive electrode active material mixture (97.8 parts by mass), carbon nanotubes (0.8 parts by mass), and polyvinylidene fluoride (1.4 parts by mass) were mixed, and the viscosity was adjusted with a solvent to obtain a slurry-like positive electrode mixture. The positive electrode mixture was coated on an aluminum foil (thickness: 30 μm) with a doctor blade so that the one-sided basis weight was 34 mg/cm$^2$, and dried at 100° C. for 10 minutes to form a positive electrode layer. Thereafter, a press treatment was performed so that the density of the positive electrode layer was 3.3 g/cm$^3$.

(2) Preparation of the Negative Electrode

Artificial graphite particles having an average particle diameter of 22 μm (96 parts by mass), styrene-butadiene rubber (3 parts by mass), and carboxymethyl cellulose (1 part by mass) were mixed, and the viscosity was adjusted with a solvent to obtain a slurry-like negative electrode mixture. The negative electrode mixture was coated on a copper foil (thickness: 15 μm) with a doctor blade to have a one-sided basis weight of 23 mg/cm$^2$ (i.e., the ratio of the positive electrode capacity to the negative electrode capacity was 1.1), and dried at 100° C. for 10 minutes to produce a negative electrode layer. Thereafter, a press treatment was performed so that the density of the negative electrode layer was 1.25 g/cm$^3$.

(3) Preparation of Batteries

The positive electrode and the negative electrode were laminated with separators (three-layer structure of PP/PE/PP, thickness: 16 μm) sandwiched therebetween to prepare an electrode assembly. A laminated battery was manufactured using the electrode body and the electrolyte solution. As the electrolyte solution, a solution obtained by dissolving $LiPF_6$ of 1.1M in EC (30 volume %), DMC (40 volume %), and EMC (30 volume %) in a mixed solvent was used.

The constraint of the cell was 100 kPa.

(4) Evaluation of Battery Performance

The activation treatment of the battery was carried out in the following procedure in a constant-current-constant-voltage manner.

Specifically, constant-current charging was performed to 4.25 V at a current value of 0.1 C, followed by constant-voltage charging until the time of constant-voltage charging was 3 hours, and then discharged to 3.0 V at a current value of 0.1 C by the constant-current method.

Measurement of Capacity Retention Rate

The following charging and discharging were performed for 200 cycles, and the capacity retention ratio (%) after 200 cycles with respect to the capacity at the initial stage (0 cycles) was calculated.

In an environment of 60° C., charging was performed at a current value of 0.3 C up to 4.25 V by constant current-constant voltage method, and discharging was performed at a current value of 0.5 C up to 3.0 V by constant current-constant voltage method.

Measurement of Resistance

The resistance of the cell was calculated by the following charging and discharging, and the resistance at the initial stage (0 cycles) was compared with the resistance after 200 cycles.

The resistivity value was calculated from the cell voltage after the cell was adjusted to 3.71 V at a current value of 0.3 C and discharged for 10 seconds at a current value of 1 C by constant current-constant voltage method.

Comparative Examples 1 to 5

Batteries in Comparative Examples 1 to 5 were prepared and evaluated in the same manner as in the Examples except that the positive electrode active material did not contain either polycrystalline particles or monocrystalline particles or the B/A value was outside the range of 1.03 to 1.9. The results are shown in Table 1.

Reference Examples 1 to 3

Batteries in Comparative Examples 1 to 3 were prepared and evaluated in the same manner as in the Examples except that the nickel ratio of the positive electrode active material is 60 mol %, and the positive electrode active material did not contain either polycrystalline particles or monocrystalline particles, or the B/A value was outside the range of 1.03 to 1.9. The results are shown in Table 1.

Reference Examples 4 and 5

Batteries of Comparative Examples 4 and 5 were prepared and evaluated in the same manner as in Examples except that the restraint pressure of the battery was 500 kPa and the positive electrode active material did not contain either polycrystalline particles or monocrystalline particles. The results are shown in Table 1.

TABLE 1

| | Polycrystalline particles | | | Monocrystalline particle | | | | | | |
|---|---|---|---|---|---|---|---|---|---|---|
| | Ni ratio (mol %) | LiO HA (mol %) | Mixing ratio (Wt %) | Ni ratio (mol %) | LiO HB (mol %) | Mixing ratio (Wt %) | B/A | Binding force (kPa) | Resistance (mΩ) | Capacity maintaining rate (%) |
| Comparative Example 1 | 80 | 0.23 | 100 | — | — | — | — | 100 | 691 | 89.8 |
| Comparative Example 2 | — | — | — | 80 | 0.13 | 100 | — | 100 | 724 | 88.5 |
| Comparative Example 3 | 80 | 0.23 | 70 | 80 | 0.13 | 30 | 0.57 | 100 | 701 | 90.5 |
| Example 1 | 80 | 0.23 | 70 | 80 | 0.24 | 30 | 1.04 | 100 | 713 | 90.8 |
| Example 2 | 80 | 0.26 | 70 | 80 | 0.29 | 30 | 1.12 | 100 | 715 | 91.5 |
| Example 3 | 80 | 0.25 | 70 | 80 | 0.41 | 30 | 1.64 | 100 | 726 | 92.1 |
| Comparative Example 4 | 80 | 0.31 | 70 | 80 | 0.61 | 30 | 1.97 | 100 | 736 | 87.3 |
| Comparative Example 5 | 80 | 0.31 | 70 | 80 | 0.75 | 30 | 2.42 | 100 | 801 | 84.4 |
| Reference Example 1 | 60 | 0.11 | 100 | — | — | — | — | 100 | 683 | 93.3 |
| Reference Example 2 | — | — | — | 60 | 0.14 | 100 | — | 100 | 708 | 93.6 |
| Reference Example 3 | 60 | 0.11 | 70 | 60 | 0.14 | 30 | 1.27 | 100 | 694 | 93.5 |
| Reference Example 4 | 80 | 0.23 | 100 | — | — | — | — | 500 | 697 | 90.5 |
| Reference Example 5 | — | — | — | 80 | 0.21 | 100 | — | 500 | 728 | 91.1 |

As shown in Table 1, batteries prepared in Examples 1 to 3, in which the nickel ratio of the positive electrode active material is 70 mol % or more of the total transition metal, and includes polycrystalline particles and monocrystalline particles, and the B/A value is within the range of 1.03 to 1.9, show superior capacity retention compared to batteries prepared in Comparative Examples 1 to 5, in which the cathode active material did not contain either polycrystalline particles or monocrystalline particles, or the B/A value was outside the range of 1.03 to 1.9.

As shown in the results of Reference Examples 1 to 3, when the nickel ratio of the positive electrode active material is 60 mol %, there is no difference in the capacity retention ratio of the battery between the case of A and the case of B below.

A: When the positive electrode active material does not contain either polycrystalline particles or monocrystalline particles B: When the positive electrode active material includes polycrystalline particles and monocrystalline particles. This result suggests that the effect of applying the positive electrode active material of the present disclosure is remarkable when the nickel ratio of the positive electrode active material is 70 mol % or more.

As shown in the results of Reference Examples 4 and 5, when the restraint pressure of the cell is 500 kPa, the positive electrode active material exhibits an excellent capacity retention rate even if the positive electrode active material does not contain either polycrystalline particles or monocrystalline particles. This suggests that application of the disclosed positive electrode active material is remarkable when the restraint pressure of the cell is less than 500 kPa.

What is claimed is:

1. A positive electrode active material comprising:

nickel contained as a transition metal in a ratio of 70 mol % or more of a total transition metal; and polycrystalline particles and monocrystalline particles, wherein a B/A value calculated from a lithium hydroxide content A mass % of the polycrystalline particles and a lithium hydroxide content B mass % of the monocrystalline particles is 1.03 to 1.9.

2. The positive electrode active material according to claim 1, wherein the positive electrode active material is provided with a layered structure.

3. The positive electrode active material according to claim 1, wherein a mass ratio of the polycrystalline particles to the monocrystalline particles is in a range of 60:40 to 90:10.

4. A battery comprising a positive electrode including the positive electrode active material according to claim 1.

5. The battery according to claim 4, wherein a constraining pressure is less than 500 kPa.

* * * * *